United States Patent [19]
Davis

[11] 4,022,245
[45] May 10, 1977

[54] SIGHT CHECK VALVE

[75] Inventor: Leon E. Davis, Silverton, Tex.

[73] Assignee: Devin S. Davis, Silverton, Tex.; a part interest

[22] Filed: Apr. 8, 1976

[21] Appl. No.: 675,067

[52] U.S. Cl. .............................. 137/559; 137/515.7; 137/855

[51] Int. Cl.² .................. F16K 37/00; F16K 15/14

[58] Field of Search ................... 116/117 R, 117 C; 137/515.7, 559, 855; 222/159; 73/228

[56] References Cited
UNITED STATES PATENTS

| | | | |
|---|---|---|---|
| 2,388,432 | 11/1945 | Nelson | 137/559 |
| 2,867,213 | 1/1959 | Thomas | 137/559 X |
| 3,131,716 | 5/1964 | Griswold | 137/559 X |
| 3,279,487 | 10/1966 | Elam | 137/559 X |

FOREIGN PATENTS OR APPLICATIONS

| | | | |
|---|---|---|---|
| 983,796 | 2/1965 | United Kingdom | 137/559 |
| 1,106,369 | 3/1968 | United Kingdom | 137/559 |

Primary Examiner—Robert G. Nilson
Attorney, Agent, or Firm—Wendell Coffee

[57] ABSTRACT

A swing type check valve is connected by a double compression coupling to an irrigation pipe. The compression sleeve over the valve is transparent so that the valve may be sight checked or visually inspected.

14 Claims, 2 Drawing Figures

SIGHT CHECK VALVE

BACKGROUND OF THE INVENTION

1. Field of the Invention

This invention relates to check valves and more particularly to a check valve which may be visually inspected.

2. Description of the Prior Art

In agricultural irrigation, often several pumps are pumped into a common irrigation pipeline. It is desirable to place a check valve upon the outlet of each pump. In such a system it is desirable to have a visual inspection of the check valve.

A previous solution to this problem is shown in Bloom et al, U.S. Pat. No. 3,085,432, where the position of the check valve flap is externally indicated.

SUMMARY OF THE INVENTION

New and Different Function

I have invented a check valve with a transparent sleeve around the valve. Therefore, my check valve may be visually inspected. The position of the check valve may be seen, and, therefore, the proper operation of the valve checked and the quantity of water flowing extimated. Also the quality of water flowing through the check valve may be checked. By "quality of water" it is meant whether there is sand in the water or air in the water. I do this by connecting the body of the check valve into the pipe by compression coupling. By a "compression coupling", I mean that type of coupling which uses flared sleeves pressed against resilient gaskets between flanges often known by the tradename of "Dresser" couplings. Therefore, by making one of the coupling sleeves of transparent material, I construct an inexpensive, compact unit which performs the function of permitting inspection of the valve and water quality. By my invention, one may be assured that the check is holding water.

Objects of the Invention

An object of this invention is to sight-check or visually inspect a check valve.

Other objects are to achieve the above with a device that is sturdy, compact, durable, lightweight, simple, safe, efficient, versatile, and reliable, yet inexpensive and easy to manufacture, install, adjust, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
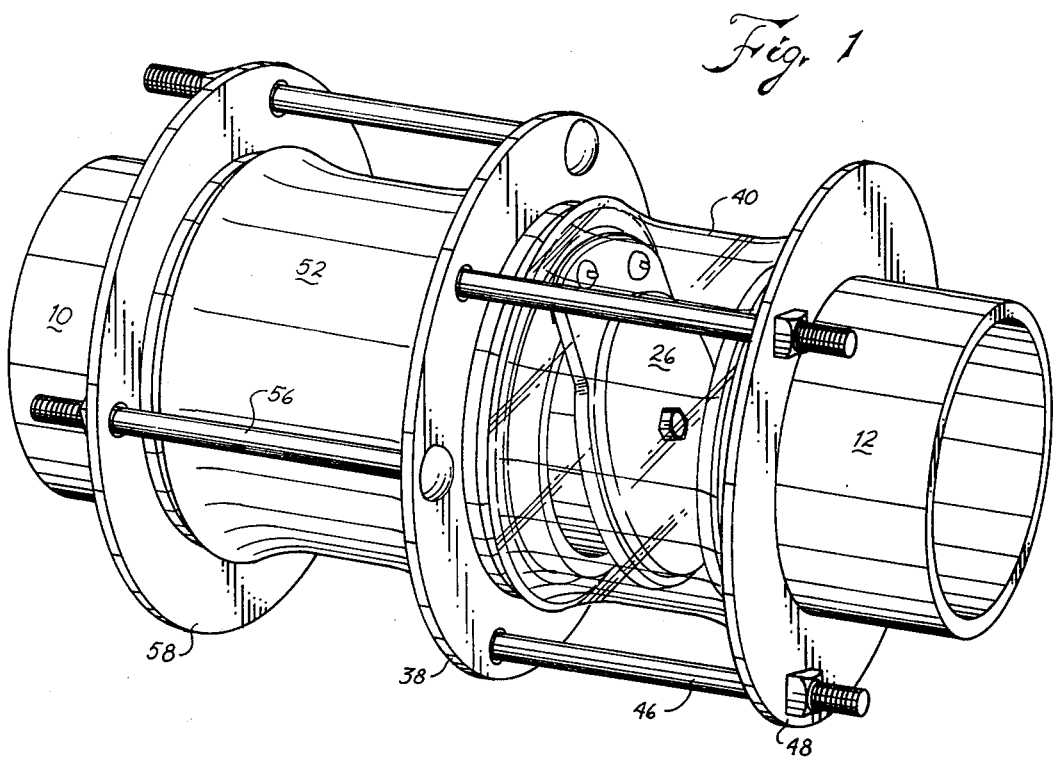
FIG. 1 is a perspective view of the valve with attached stub ends of pipe.

Referring more particularly to the drawing, there may be seen an embodiment of the drawing attached to a pipe. The pipe includes inlet end 10 and outlet end 12. The inlet end and outlet end have been shown quite short. It will be understood by those skilled in the art that they could be part of an extending pipeline.

Figure 2:
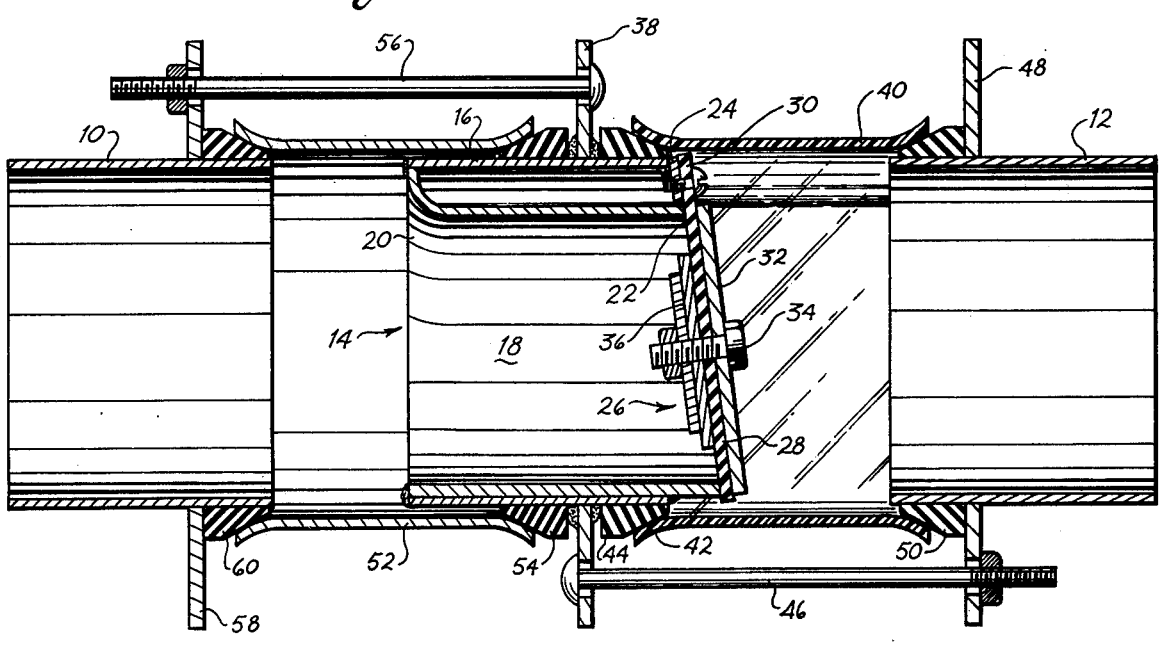
FIG. 2 is a sectional view of the valve attached to stub ends of a pipe.

Valve body 14 includes a cylindrical outer shell 16. The cylindrical outer shell 16 has the same diameter as the pipe with the ends 10 and 12. An inner flow pipe 18 is telescoped within the outer shell 16. As may be seen in the drawing, the inner flow pipe is not coaxial with the outer shell 16. The outer shell has inlet end 20. The inner flow pipe 18 is fluidly connected to the outer shell at the inlet end 20 as by welding. At outlet end 22 of the valve body 14, the space between the outer shell 16 and the inner flow pipe 18 is filled with filler 24. Also as may be seen from the drawing, particularly FIG. 2, the outlet is not normal to the axis, but is at an acute angle to the axis. The filler 24 at the outlet 22 between the shells 16 and the flow pipe 18 is wider at the top than at the bottom inasmuch as the flow pipe is not centered within the outer shell. As shown, the filler 24 is not a complete circle because the flow pipe is tangent at the bottom.

Flap valve 26 is anchored to the filler 24. The flap valve 26 is constructed primarily of a sheet of reinforced synthetic rubber 28, a flexible, resilient material. The reinforced rubber flap 28 has ear 30 which is anchored as by screws to the filler 24. The main circular portion of the flap 28 is stiffened and weighted by metal reinforcement plate 32 which is held to the flap by axial bolt 34. The plate 32 is on the outlet side of the flap whereas on the inner side thereof are backing plates 36. It may be seen that metal plate 32 and the backing plates 36 stiffen and reinforce the flap 28 over the area of the outlet of the flow pipe 18. Thus, it may be seen that I have provided a flap valve having a closure over the outlet of the flow pipe, which closure is swung from an anchor on the filler which is, in effect, on the valve body 12. Also, as may be seen, the flap valve 26 is of smaller diameter than the outer shell 16. Peripheral body flange 38 is attached as by welding to the outer shell 16 at about the center thereof.

Transparent tube or band or sleeve 40 covers the valve 26. Inasmuch as the sleeve 40 if made of transparent material, the valve 26 is readily observable as is the water flowing through the connection. The sleeve 40 is flared on each end as is common with compression sleeves for compression couplings. Body end 42 of the transparent sleeve is telescoped over the outlet end 22 of the body 14. Body resilient gasket 44 between the transparent sleeve 40 and the body flange 38 provides a fluid seal at this point when the transparent sleeve 40 is jammed against its gasket 44. As is known in the art, the sleeve 40 is jammed against its gasket 44 by bolts 46 extending from body flange 38 to loose outlet flange 48. The outlet end of sleeve 40 is flared and telescoped around the outlet end 12 of the pipe and is sealed thereto by resilient gasket 50.

Inlet band or sleeve 52 is fluidly sealed to the inlet end of the shell 16 in similar manner. I.e., the flared body end of sleeve 52 is jammed against gasket 54 by bolts 56 extending from the body flange 38 to inlet loose flange 58. The body end of the inlet sleeve 52 is telescoped over the inlet end of shell 16 and the inlet end of the sleeve 52 is telescoped over the inlet pipe 10. Gasket 60 provides a seal between the inlet band 52 and loose inlet flange 58.

On small size pipe, the entire assembly may be made of clear acrylic.

As an aid to correlating the terms of the claims to the exemplary drawing, the following catalog of elements is provided:

| | |
|---|---|
| 10 inlet pipe | 36 backing plates |
| 12 outlet pipe | 38 body flange |
| 14 body | 40 transparent sleeve |
| 16 outer shell | 42 body end |
| 18 flow pipe | 44 body gasket |
| 20 shell inlet | 46 bolt |
| 22 shell outlet | 48 loose outlet flange |
| 24 filler | 50 gasket |
| 26 valve | 52 inlet sleeve |
| 28 flap, rubber | 54 gasket |
| 30 ear | 56 bolts |
| 32 metal reinforcement | 58 loose inlet flange |
| 34 axial bolt | 60 gasket |

The embodiment shown and described above is only exemplary. I do not claim to have all the parts, elements or steps described. Various modifications can be made in the construction, material, arrangement, and operation, and still be within the scope of my invention. The limits of the invention and the bounds of the patent protection are measured by and defined in the following claims. The restrictive description and frawing of the specific example above do not point out what an infringement of this patent would be, but are to enable the reader to make and use the invention.

I claim as my invention:

1. A visual check valve adapted to be connected in a pipe between
    a. an inlet end of the pipe and
    b. an outlet end of the pipe;
COMPRISING IN COMBINATION:
    c. a valve body having
        i. an outer cylindrical shell with an outlet and inlet end equal to the diameter of the pipe,
        ii. an inner flow pipe telescoped within the outer shell, and
        iii. a filler between the flow pipe and the outlet end of the shell,
    d. a flap valve having
        i. a closure over the outlet of the flow pipe,
        ii. swung from an anchor on the valve body,
    e. a peripheral body flange extending around the outer shell,
    f. a transparent sleeve
        i. of transparent material
        ii. with a body end and a pipe end,
        iii. the body end telescoped over the outer shell outlet end,
    g. a resilient gasket around the outer shell between the transparent sleeve and the body flange,
    h. outlet jam means for jamming the transparent band against its gasket, and
    j. an inlet sleeve, and
    k. inlet means for fluidly sealing the inlet sleeve to the inlet end of the outer shell.

2. The invention as defined in claim 1 wherein
    m. said closure is a flexible flap with a reinforcement over the outlet of the flow pipe in the form of a metal disc bolted to said flexible flap having a diameter as large as said flow pipe.

3. The invention as defined in claim 2 wherein
    n. said flexible flap is cut from a sheet of reinforced synthetic rubber.

4. The invention as defined in claim 1 with an additional limitation of
    m. said outlet of said flow pipe being at an angle to the normal surface of the pipe and the flexible flap attached to the short side thereof.

5. The invention as defined in claim 1 with an additional limitation of
    m. said transparent sleeve it flared at each end.

6. The invention as defined in claim 1 with additional limitations of
    m. said inlet sleeve telescoped over said inlet end of the outer shell,
    n. a resilient gasket around the outer shell between the inlet sleeve and the body flange,
    o. a loose inlet gasket between a loose inlet flange and said inlet sleeve, and
    p. bolts extending from said body flange to said loose inlet flange.

7. The invention as defined in claim 1 with additional limitations of
    m. said inlet sleeve is connected to the inlet end of the pipe, and
    n. the transparent sleeve is connected to the outlet end of the pipe.

8. The invention as defined in claim 1 wherein
    m. said outlet jam means includes bolts extending from said body flange to an outlet loose flange and
    n. an outlet loose gasket.

9. The invention as defined in claim 8 with an additional limitation of
    o. said tranparent sleeve is flared at each end.

10. The invention as defined in claim 9 wherein
    p. said inlet sleeve is connected to the inlet end of the pipe, and
    q. the transparent sleeve is connected to the outlet end of the pipe.

11. The invention as defined in claim 10 with additional limitations of
    r. said inlet sleeve is telescoped over said inlet end of the outer shell,
    s. a resilient gasket around the outer shell between the inlet sleeve and the body flange,
    t. a loose inlet flange around the inlet end of the pipe,
    u. a loose inlet gasket between said loose inlet flange and said inlet sleeve, and
    v. bolts extending from said body flange to said loose inlet flange.

12. The invention as defined in claim 11 wherein
    w. said closure is a flexible flap with a reinforcement over the outlet of the flow pipe in the form of a metal disc bolted to said flexible flap having a diameter as large as said flow pipe.

13. The invention as defined in claim 12 wherein
    x. said flexible flap is cut from a sheet of reinforced synthetic rubber.

14. The invention as defined in claim 13 with an additional limitation of
    y. said outlet of said flow pipe being at an angle to the normal surface of the pipe and the flexible flap attached to the short side thereof.

* * * * *